Nov. 3, 1959 L. JOFFE 2,911,178
MICRO-SWING HOLDER FOR DIAL INDICATOR
Filed May 16, 1958
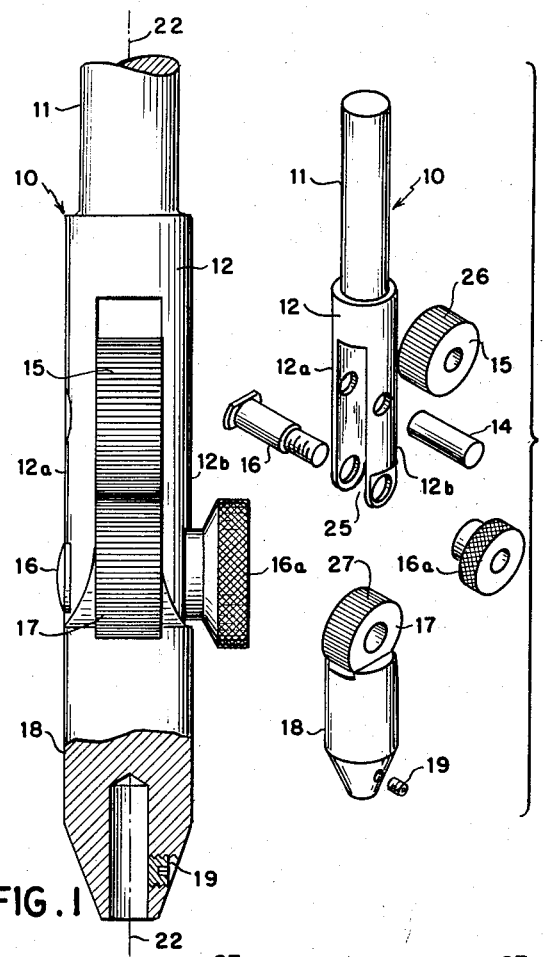
FIG. 1
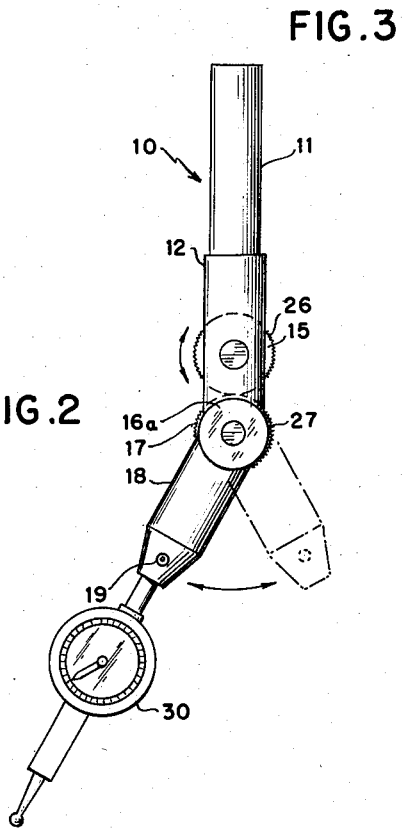
FIG. 2
FIG. 3
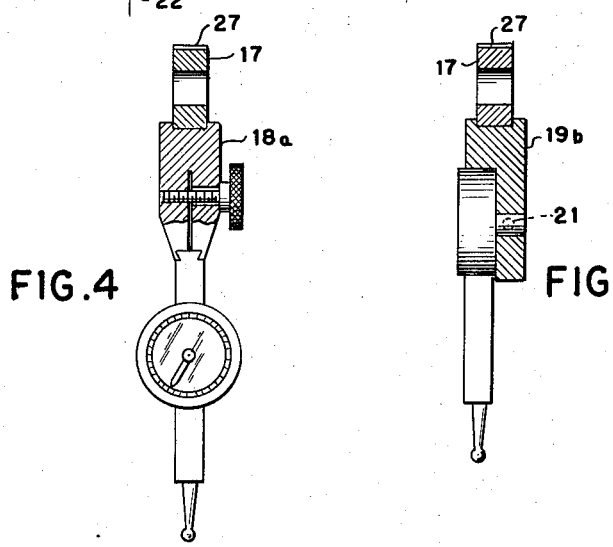
FIG. 4
FIG. 5
Leon Joffe
*INVENTOR.*
BY *J. E. Foster*
ATTORNEY

United States Patent Office 2,911,178
Patented Nov. 3, 1959

2,911,178

MICRO-SWING HOLDER FOR DIAL INDICATOR

Leon Joffe, New Rochelle, N.Y.

Application May 16, 1958, Serial No. 735,765

8 Claims. (Cl. 248—291)

This invention relates to a micro-swing holder for a dial indicator.

When positioning a work-piece for a machine operation to be performed on the work-piece, it may be necessary to position the work-piece accurately, or to be able to measure a dimension on the piece accurately. The usual dial indicator provides an accurate indicating instrument for measuring a small dimension involving physical contact with a work-piece. By suitably supporting the dial indicator, the accuracy of the indicator may be utilized for measuring various dimensions and for locating surfaces before or after machining operations.

The object of this invention is to provide an angularly movable or micro-swing holder for a dial indicator so the indicator may be adjustably positioned at various locations to engage a work-piece surface.

The construction and the manner of operation of the dial holder of this invention are described in the following specification, in connection with the accompanying drawings, in which Figure 1 is a front elevational view of an assembled micro-swing holder for a dial indicator;

Figure 2 is an exploded view of the holder of Figure 1;

Figure 3 is a front view of the holder of Figure 1, showing two extreme positions of the chuck or head in which the dial indicator is supported during operation of the holder;

Figures 4 and 5 are front views of a holder in which different shaped receiving heads are used to accommodate and support dial indicators of different types.

As shown in Figures 1 and 2, a dial holder 10 of this invention comprises a shank 11, a bifurcated structure 12 consisting of two tines 12–a and 12–b, a pivot pin 14 supporting a driver wheel 15, a clamping bolt 16 and nut 16–a, and a driven wheel 17 integrally supporting a chuck or head 18 provided with a lock screw pin 19 to lock and hold the shaft of an inserted dial indicator which is not, itself, part of the present invention.

The shank 11 is symmetrical about a main longitudinal or vertical axis 22. The two tines 12–a and 12–b are extensions of the shank 11, but are preferably integral with the shank 11 in the interest of rigidity and ultimate accuracy. The two tines 12–a and 12–b are shaped to be equally spaced from the main axis 22, and define a central space 25 between the two tines.

The pivot pin 14 extends across space 25 and is anchored at both ends in the respective tines. The driver wheel 15 is rotatably supported on the pivot pin 14 and serves as the actuating and adjusting wheel to position the holder. Movement of the wheel is easily controlled between the thumb and a finger of an operator.

The peripheral edge of the driver wheel 15 is provided with fine teeth 26 which mesh with similar teeth 27 on the driven wheel 17. Thus, driver wheel 15 may be very finely angularly turned to move the driven wheel 17 and the head 18 through a closely adjustable small angle, if necessary, to move the dial indicator finger through a small micro-distance.

Once the fine adjustment of the driven wheel and head is established, the lock nut 16–a is tightened on its bolt 16 to clamp the two tines against the driven wheel 17 to lock the holder head 18 and the dial indicator 30 in place against unwanted displacement. The dial indicator is held in place in the head 18 by the lock pin screw 19.

To accommodate dial indicators of different types, different types of driven wheel and head assembly may be used.

In Figure 4 is shown a split head 18–a with a groove for receiving a sliding tongue on a dial indicator. The split head is then tightened to hold the dial indicator clamped to the head.

In Figure 5, a different wheel and head assembly is shown, to accommodate a dial indicator with a button shaft to fit into a recess in the head 19–b. A suitable side lock-in screw locks the indicator to the head 19–b.

Thus by the structure shown herein, a dial indicator may be suitably supported and held in the holder for fine accurate adjustment to be positioned against a work-piece surface to obtain an accurate measurement of a selected dimension or distance relating a working operation to a reference surface.

Although the bifurcated structure 12 is shown symmetrically disposed with two tines of equal size, one tine may be made heavier and more massive to provide a more rigid backing and support for the assembly.

The invention is not limited to the exact details of construction shown, since they may be modified within the spirit and scope of the invention as claimed.

What is claimed is:

1. A dial indicator holder comprising a vertical shank; a fork consisting of two horizontally spaced tines integral with the shank and extending vertically downward from the shank; a first toothed roller disposed in the space between the two tines and supported for free angular manual adjustment on a horizontal pin supported in the two tines and extending across the space between them; a second toothed roller meshed with the first toothed roller and similarly supported for free angular motion on a horizontal bolt threaded on one end and supported between the two tines and extending across the space between the two tines, with the threaded end of the bolt extending out beyond one tine and supporting a threaded nut adjustably movable on the bolt to press the two lines tightly against the second toothed roller to lock said roller in position against the undesired movement; and a head integral with said second toothed roller over a bottom arcuate portion of the roller periphery and having a vertical central orifice to receive the shank of a dial indicator.

2. A dial indicator holder comprising a vertical shank symmetrically about a vertical axis to fit co-axially into a chuck; two bars suspended from the shank and spaced equidistantly from the vertical axis; a horizontal pin extending between the two bars and anchored thereon; a peripherally-toothed drive wheel rotatably supported on the horizontal pin; a peripherally-toothed driven wheel meshed with the drive wheel and supporting an integral head to receive an indicator support element; and a clamping means to clamp the driven wheel against undesired displacement after the drive wheel has been rotatably adjusted to desired position.

3. A dial indicator holder comprising a shank to be disposed in and supported from a tool support; a bifurcate support having two arms integral with and suspended from the shank and extending parallel to the extended axis of the shank; a pivot pin disposed transversely of the axis and anchored on the bifurcate support; a manually operable driver wheel rotatably supported on the pivot pin; a bolt transversely supported on the bifurcate support; a driven wheel rotatably supported on the bolt and operable by the driver wheel to a selected position; locking means on the bolt for releasably locking the driven wheel in selected position; and means carried by the driven wheel for supporting and positioning a dial indicator.

4. A dial indicator holder, as in claim 3, in which the means for supporting and positioning a dial indicator, consists of a head having a wall defining an axial recess to receive the shank of a dial indicator and having a lock screw adjustably supported in the wall to lock the shank against unwanted displacement.

5. A dial indicator holder, as in claim 3, in which the supporting means for the dial indicator consists of a split head to receive a tenon of a dial indicator body, and of a clamping element to compress the split head against such tenon.

6. A dial indicator holder, as in claim 3, in which the supporting means is shaped to receive and accommodate a correspondingly shaped element on the body of a dial indicator, and the means also includes an adjustable element to releasably lock the body element of the indicator against displacement.

7. A dial indicator holder comprising a shank to be disposed in and supported from a tool support; a bifurcate support having two arms integral with and suspended from the shank and extending parallel to the extended axis of the shank; a pivot pin disposed transversely of the axis and anchored on the bifurcate support; a manually operable driver wheel rotatably supported on the pivot pin; a bolt transversely supported on the bifurcate support; a driven wheel rotatably supported on the bolt and operable by the driver wheel to a selected position; locking means on the bolt for releasably locking the driven wheel in selected position; and means carried by the driven wheel for supporting and positioning a dial indicator.

8. A dial indicator holder, as in claim 7, in which one arm of the bifurcate support is more massive than the other arm, to provide a more rigid backing arm for the final assembly.

References Cited in the file of this patent

UNITED STATES PATENTS

| | | |
|---|---|---|
| 544,216 | Droste | Aug. 6, 1895 |
| 1,172,437 | Crothers | Feb. 22, 1916 |
| 2,267,583 | Carroll | Dec. 23, 1941 |
| 2,452,301 | Hester | Oct. 26, 1948 |
| 2,476,239 | Duncan | July 12, 1949 |
| 2,601,965 | Scalise | July 1, 1952 |
| 2,777,207 | Welch | Jan. 15, 1957 |